Dec. 15, 1953

H. G. KLEMM ET AL 2,662,460

IMPLEMENT WITH PLURALITY OF PLOW ELEMENTS

Filed April 11, 1949

INVENTORS
HERMAN G. KLEMM
NORAL A. NELSON
BY
W. M. Alexander
& E. J. Herlich
ATTORNEYS Dec. 15, 1953  H. G. KLEMM ET AL  2,662,460
IMPLEMENT WITH PLURALITY OF PLOW ELEMENTS
Filed April 11, 1949
11 Sheets-Sheet 3

INVENTORS
HERMAN G. KLEMM
NORAL A. NELSON
BY
W. M. Alexander
& E. J. Herlich
ATTORNEYS Dec. 15, 1953  H. G. KLEMM ET AL  2,662,460
IMPLEMENT WITH PLURALITY OF PLOW ELEMENTS
Filed April 11, 1949  11 Sheets-Sheet 4

INVENTORS
HERMAN G. KLEMM
NORAL A. NELSON
BY H. M. Alexander
& E. J. Iverlich
ATTORNEYS Dec. 15, 1953
H. G. KLEMM ET AL
2,662,460
IMPLEMENT WITH PLURALITY OF PLOW ELEMENTS
Filed April 11, 1949
11 Sheets-Sheet 5

Fig. 6

INVENTORS
HERMAN G. KLEMM
NORAL A. NELSON
BY
W. M. Alexander
& E. J. Herlich
ATTORNEYS Dec. 15, 1953     H. G. KLEMM ET AL     2,662,460
IMPLEMENT WITH PLURALITY OF PLOW ELEMENTS
Filed April 11, 1949     11 Sheets-Sheet 6

Fig. 7

INVENTORS
HERMAN G. KLEMM
NORAL A. NELSON
BY H. M. Alexander
& E. J. Herlich
ATTORNEYS Dec. 15, 1953  H. G. KLEMM ET AL  2,662,460
IMPLEMENT WITH PLURALITY OF PLOW ELEMENTS
Filed April 11, 1949  11 Sheets-Sheet 11

INVENTORS
HERMAN G. KLEMM
NORAL A. NELSON
BY H. M. Alexander
E. J. Herlich
ATTORNEYS Patented Dec. 15, 1953

2,662,460

UNITED STATES PATENT OFFICE 2,662,460

IMPLEMENT WITH PLURALITY OF PLOW ELEMENTS

Herman G. Klemm, Birmingham, and Noral A. Nelson, Royal Oak, Mich., assignors to Harry Ferguson, Inc., Detroit, Mich., a corporation of Delaware Application April 11, 1949, Serial No. 86,752

10 Claims. (Cl. 97—53)

This application relates to a plow and more particularly to a disc plow, which may, if desired, be connected to a tractor.

A disc plow during operation tends to move laterally of its intended direction of movement over the ground. The tractor pulling the plow can to some extend stop the lateral movement, but some other restraining means is desirable. Such means which will act positively whether two or three discs are used becomes a necessity when the hitch connecting the tractor and plow is of the type that will permit a certain amount of limited lateral movement of the implement relative to the tractor.

The average farm tractor is capable of pulling a two-bottom or two-disc plow in any soil. Yet conditions may sometimes arise in which the same tractor can easily pull an extra disc or bottom, and it becomes desirable to do this whenever possible in order to save time. It may be uneconomical for the farmer to have both a two-disc plow and a three-disc plow, and so it becomes desirable to provide a plow that may be readily converted from two plowing elements to three and vice versa.

An object of the present invention is to provide improvements in a disc plow and more particularly in a furrow wheel and its mounting, by which lateral movement of the plow in operation is restrained.

A further object is to provide improved means in a disc plow for restraining and controlling its lateral movement, whereby the plow may be connected to a tractor by means of a hitch that is capable of limited lateral movement and so permits limited lateral movement between plow and tractor.

Another object is to provide an improved plow on which the number of plowing elements may be readily increased or decreased as the occasion demands. Such a plow may be of the disc type in which the discs may be changed from two to three and vice versa.

Further objects and advantages will become apparent as the following description proceeds, taken in connection with accompanying drawings in which.

Although the invention is susceptible of various modifications and alternative constructions and uses, we have shown in the drawings and shall herein describe in detail the preferred embodiment of the invention. It is to be understood, however, that we do not intend to limit the invention by such disclosure, but mean to cover all modifications and alternative constructions and uses falling within the spirit and scope of the invention as expressed in the appended claims.

The three-disc plow that is exemplary of the present invention in one form is seen in its entirety in Figs. 1–4, inclusive, wherein it is designated by the reference character 20. This plow has a longitudinal beam member 21, which extends in the direction of the intended line of movement of the plow during operation and which may be of hollow tubular form as shown in Fig. 13. A tail member 22 extends diagonally leftwardly rearwardly from the rear end of the longitudinal member 21 and terminates in a depending portion 23. As shown in Fig. 13, the tail member may be of hollow construction and has a tubular front end 24, which extends into the rear end of the beam 21 to close the same and in assembly provides a smooth pleasing continuation of the beam member 21.

The tail member 22 is detachably secured to the beam 21 by means of bolts 25, nuts 26 on the bolts, and bushings 27 on the bolts, which seat in openings in the beam 21 and the front portion 24 of the tail member 22. This front portion has transverse tubular bridges 28, through which the bolts 25 extend. The front end of the beam 21 is closed by a cap 29. An upwardly extending bracket 30, which is shown by way of example to be of hollow triangular shape, is secured as by welding, to the top of beam 21 near its front end and a transverse bracket 31 is secured similarly to the under side of the beam 21. A cross shaft 32 with offset ends 33, is clamped by U-bolts 34 in a groove in the lower side of the transverse bracket 31.

The bracket 30 and the ends 33 of the crossshaft 32 provide three properly spaced points for attachment to the rear ends of the triangular arrangement of hitch links found in certain commercially well-known tractors. These connections are through ball joints so that these links will permit limited lateral movement of the plow with respect to the tractor.

Hangers 36 and 37 are secured, for example, by welding, to the lower side of the beam 21. Hanger 36 depends rightwardly and rearwardly from a forward portion of the beam, and hanger 37, leftwardly and forwardly from a rearward portion. To the lower end of each of the hangers 36 and 37 and the vertical portion 23 of the tail member 22 is secured, for example, by welding, a short plate 38, which extends diagonally leftwardly forwardly and carries at its front side an upper flange 39 and a lower flange 40.

Figure 6:
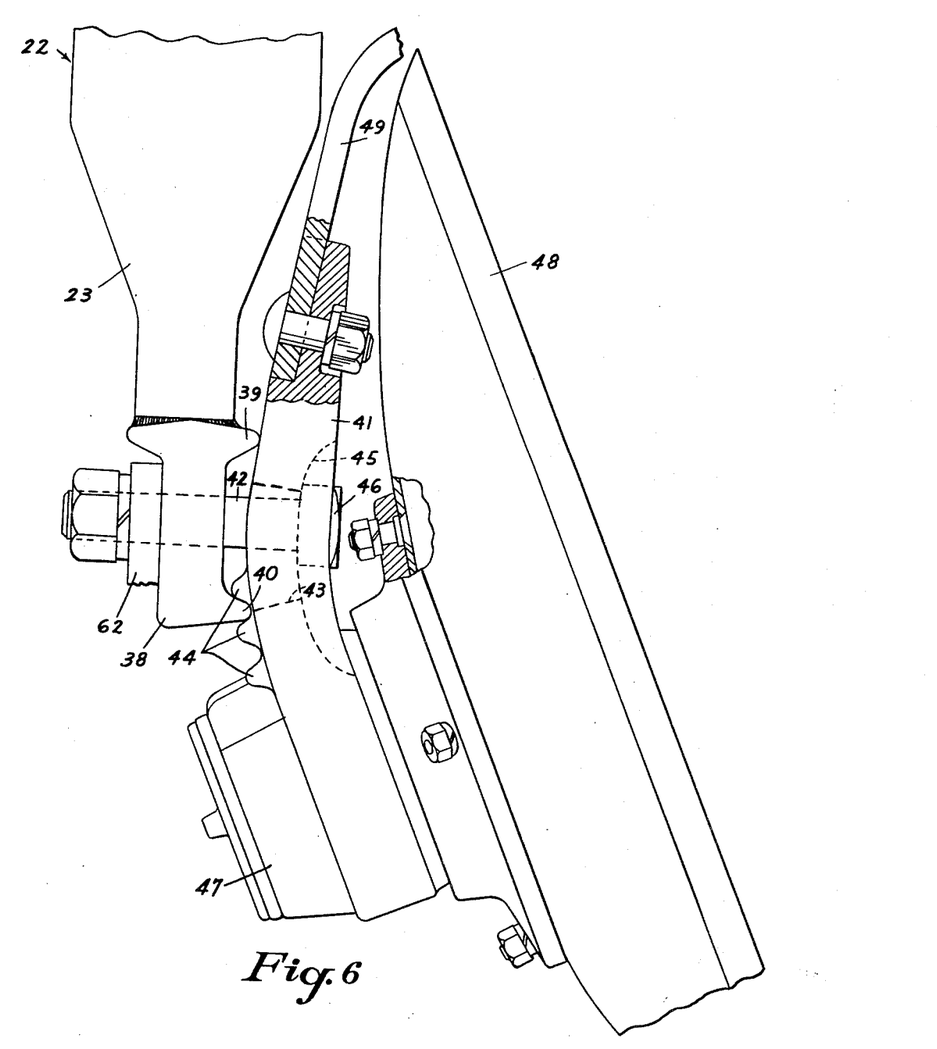
Fig. 6 is a detail view partially in section, the adjustable mounting of a plow disc and its scraper.

Fig. 6 illustrates the lower end of the tail member 22 and the plate 38 welded thereto and various parts about to be described associated with the plate 38, but this figure is also illustrative of corresponding parts associated with the plates 38 secured to the hangers 36 and 37. To the plate 38 is secured a support 41 by bolts 42, which extend through elongated holes 43 in the support. The support has three ridges 44 forming two grooves between them with which the lower flange 40 in the plate 38 is engageable. Thus the support may have two vertical positions with respect to the plate, the slots 43 permitting these two positions. The upper flange 39 on the plate 38 engages the support 41. The support 41 has a recess 45 receiving a head 46 on the bolt 43. The support 41 has a hub portion 47, which houses a suitable bearing, not shown, for journaling a sub shaft, also not shown, attached to a concave-convex plow disc 48.

There are three plow discs 48, one associated with each of hangers 27 and 28 and the tail member 22, and these discs are arranged in a diagonal line extending rightwardly forwardly. The concave side of each disc faces rightwardly and forwardly. Each disc is inclined rearwardly, and the amount of inclination can be decreased by upward adjustment of the support 41 from the position of Fig. 6 to that of Figs. 4 and 6, in which the flange 40 engages the lower groove between ridges 44. To each support 38 is bolted a bracket 49 carrying a scraper 50 for the plow disc 48.

Figures 3, 13:
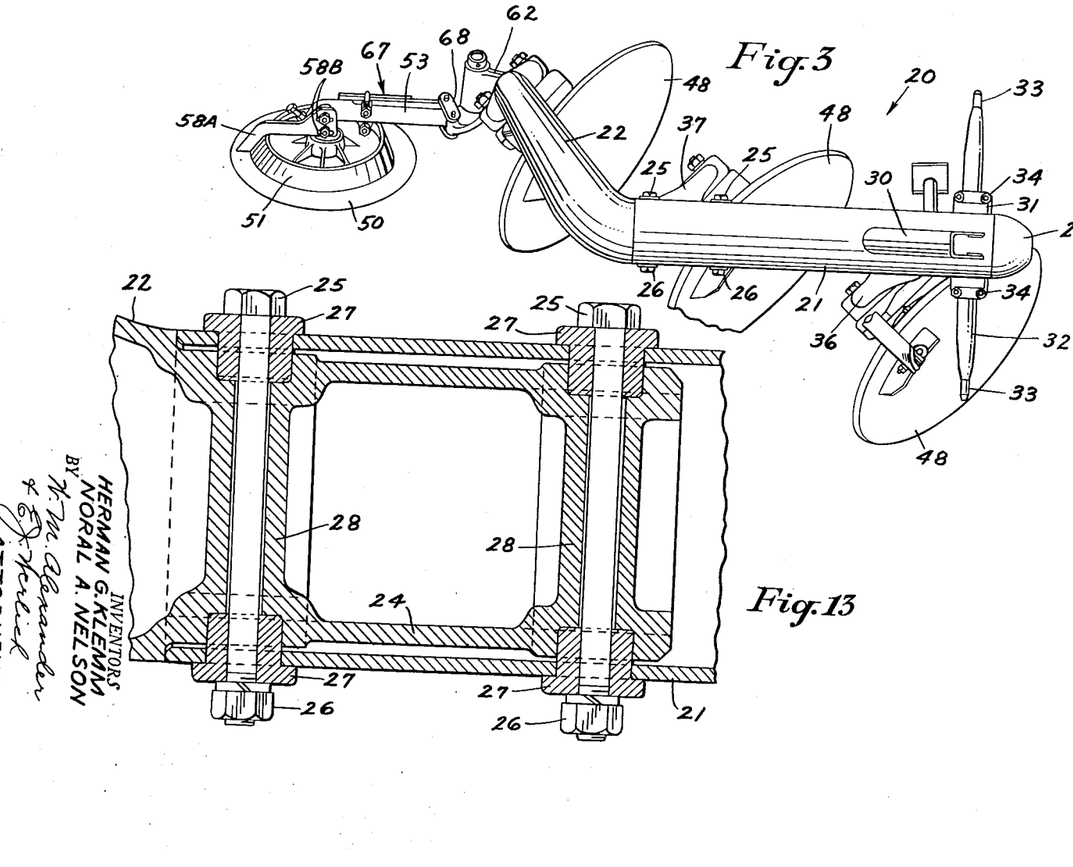
Fig. 3 is a plan view of the plow.
Fig. 13 is a sectional view taken on the line 13—13 of Fig. 1.

When the plow is in operation, it will be drawn rightwards as viewed in Fig. 3, and the forces of the ground upon the plow discs 48 tend to move the plow leftward of its intended line of movement, or upward as viewed in Fig. 3. The tendency becomes greater if the plow is connected to a tractor by links that permit limited lateral movement of the plow with respect to the tractor, as the hitch links connectible with the top bracket 30 and the ends 33 on the cross-shaft 32 were previously described.

Figure 7:
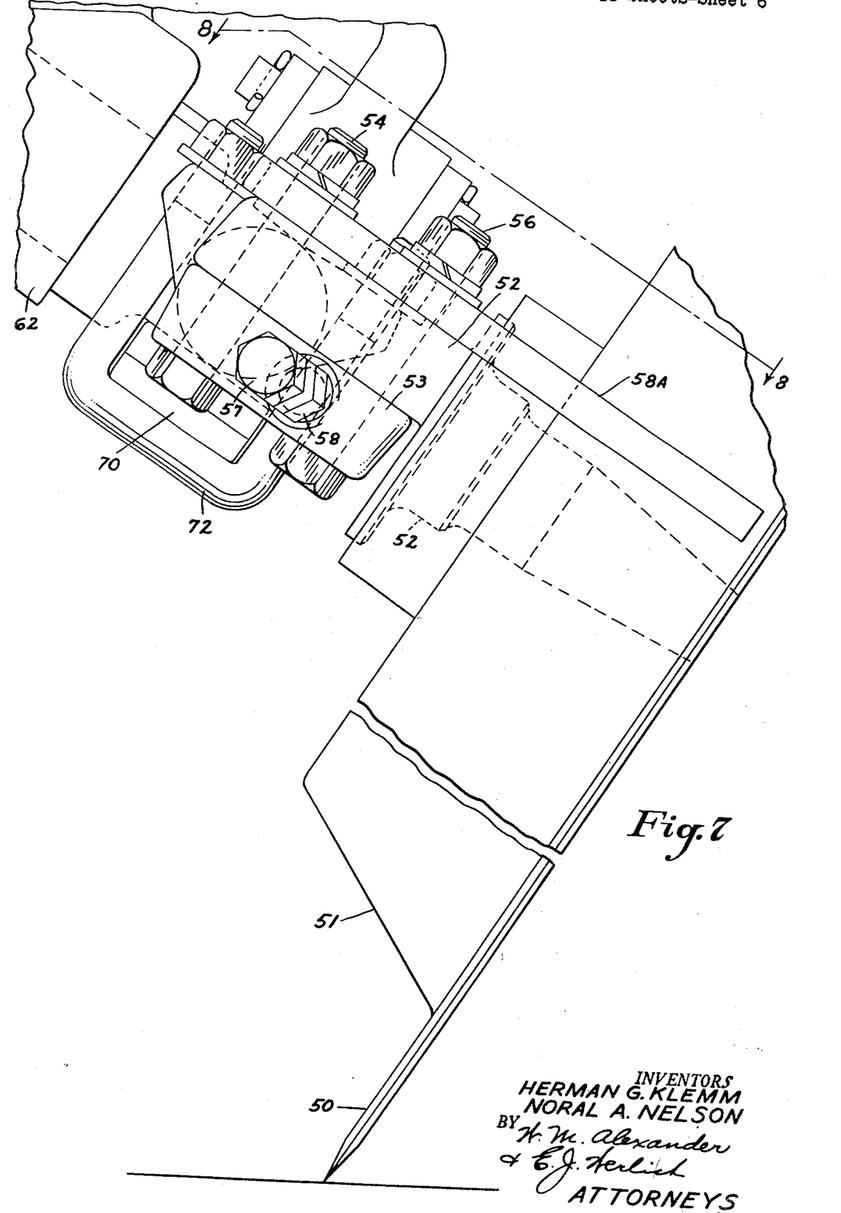
Fig. 7 is a detail view showing a furrow wheel and its mounting.
Figure 10:
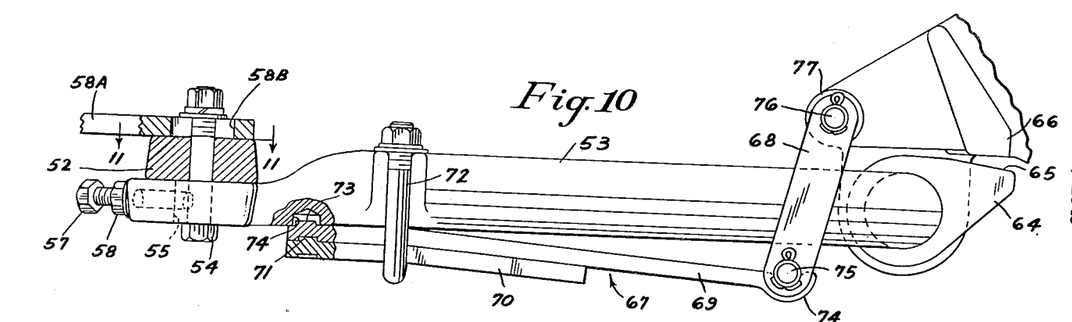
Fig. 10 is a sectional view taken on the line 10—10 of Fig. 8.
Figure 11:
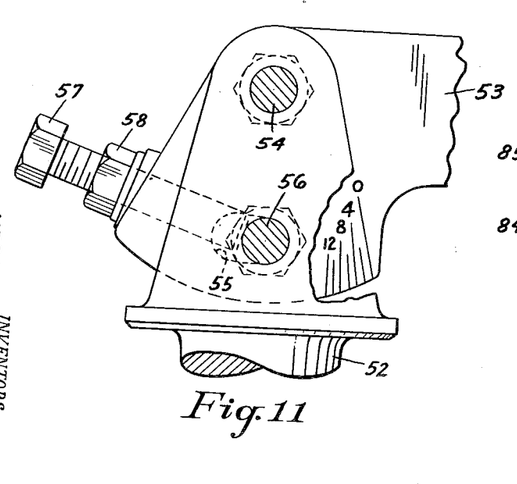
Fig. 11 is a sectional view taken on the line 11—11 of Fig. 10.

In order properly to restrain attempted lateral movement of the plow, a furrow wheel is provided and is mounted on the plow in accordance with the principles of the present invention. The furrow wheel comprises a disc 50 (Figs. 2-5) to which is secured a member 51 presenting an outer conical surface and being adapted to limit penetration of the disc in the ground. The disc 50 and associated member 51 are journaled upon a part 52, adjustably secured to an arm 53, as shown in Figs. 10 and 11. A bolt 54 provides a pivot for the part 52 on the arm 53 for limited angular movement permitted by a slot 55 in the arm 53 and a bolt 56 extending through the slot and the part 52. An adjustable screw 57 with locknut 58 provides a rearward stop for the bolt 56 in its movement in the slot 55. The screw may be set to limit the angle that the part 52 and the furrow disc 50 may assume with respect to the arm 53, and the angle is indicated by suitable indicia on the arm 53, as seen in Fig. 11. The furrow wheel is provided with a scraper 58A (Figs. 3, 7, and 10) secured to the part 52 by the bolts 54 and 56, which are received in elongated openings 58B in the scraper permitting its adjustment.

Figure 1:
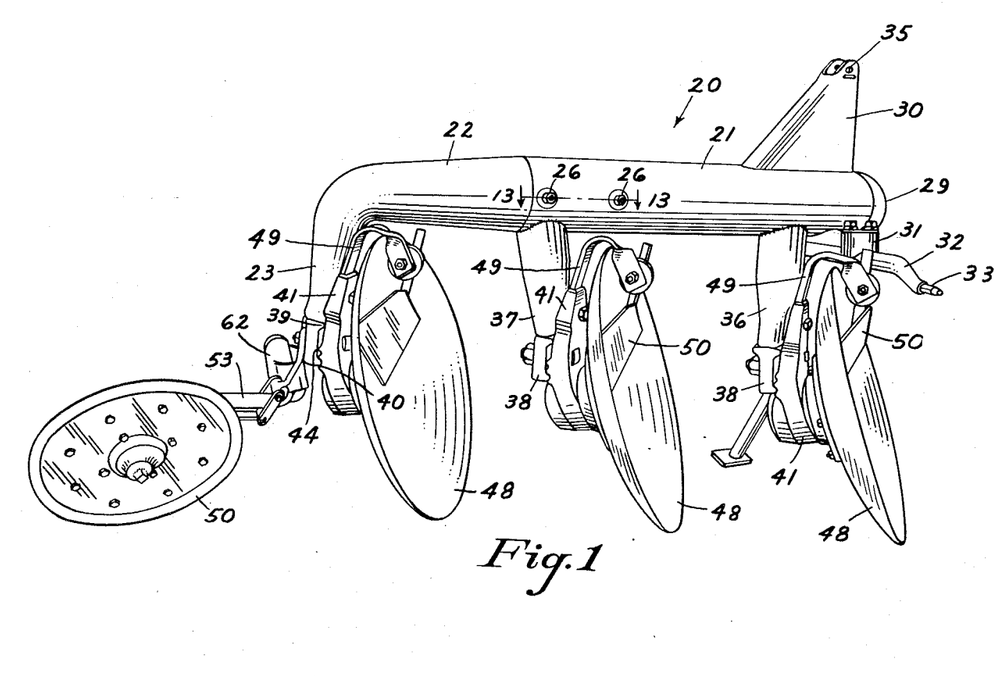
Figure 1 is a view of a three-disc plow of the present invention, taken from one side.
Figure 2:
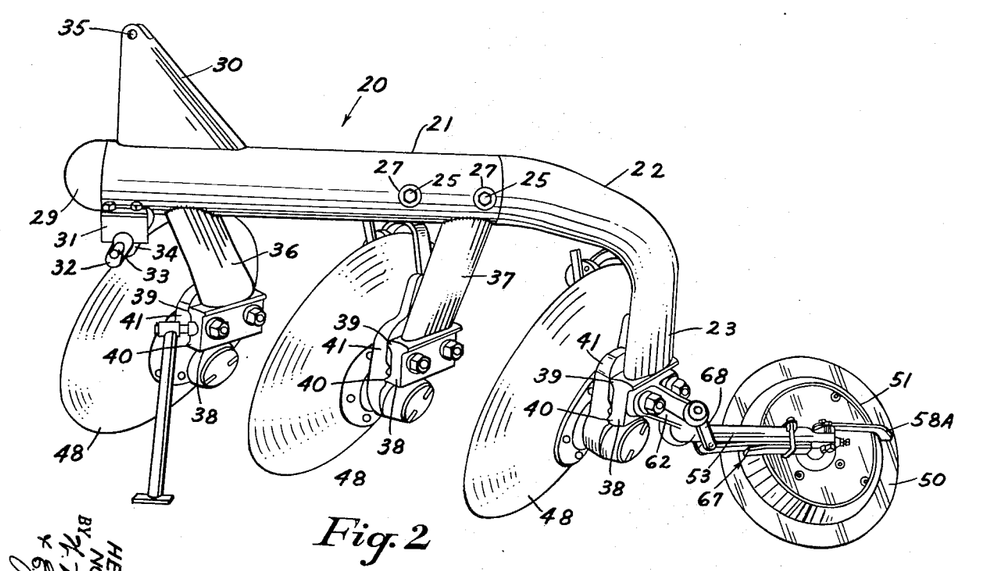
Fig. 2 is a view of the same plow taken from the other side.
Figures 4, 5:
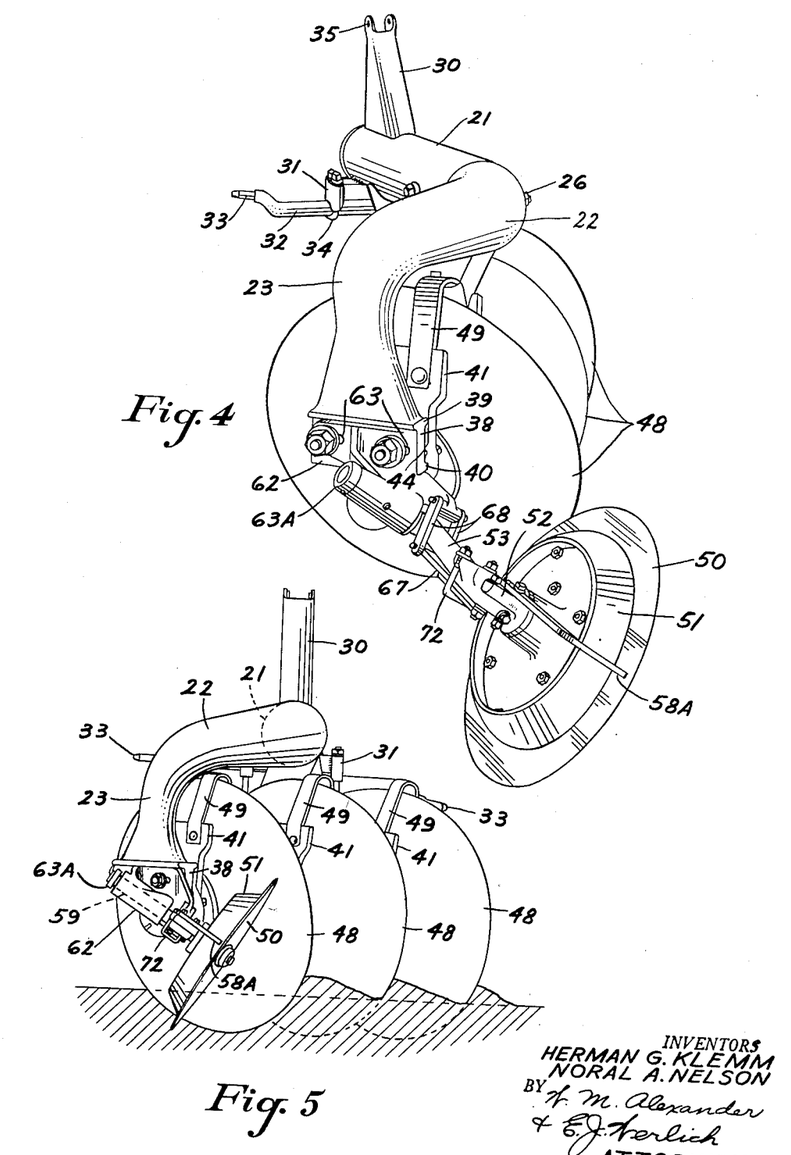
Fig. 4 and 5 are views of the plow taken from the rear.
Figure 8:
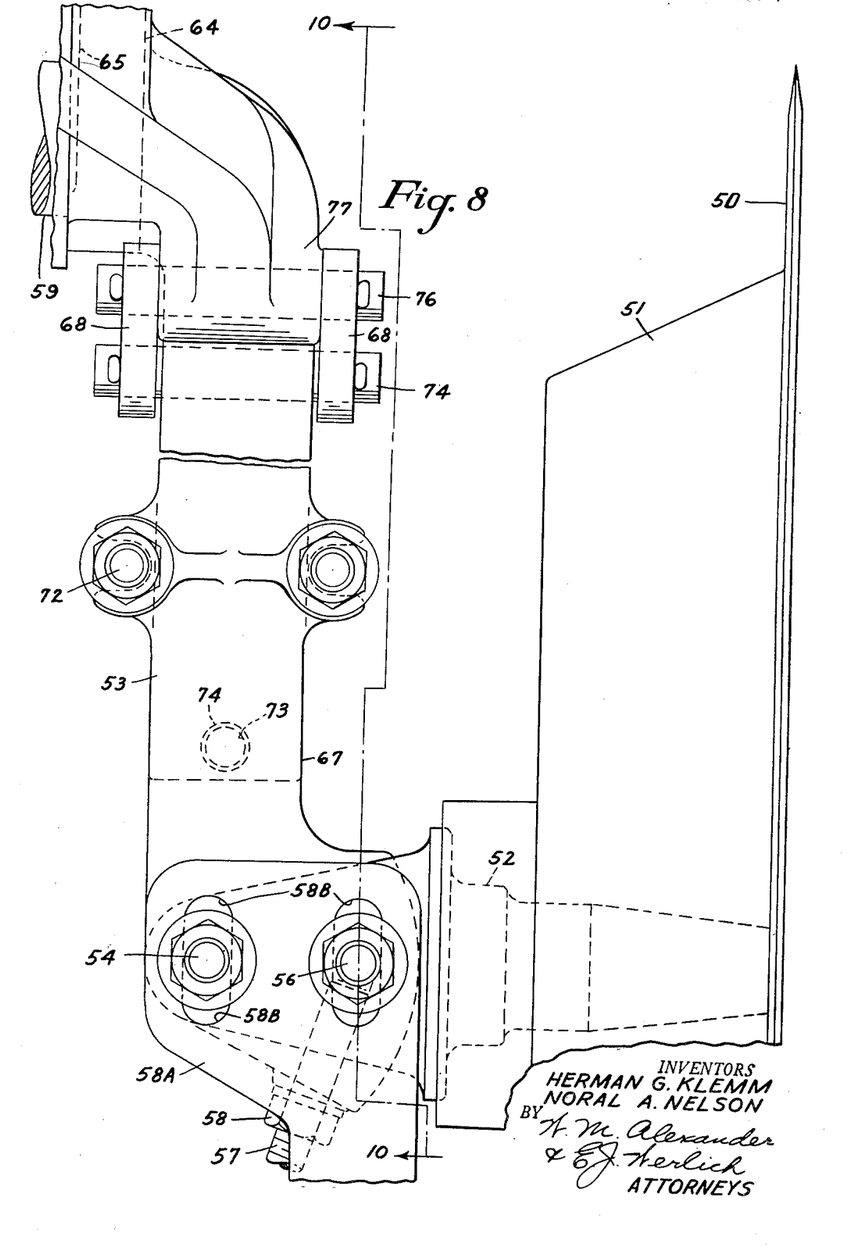
Fig. 8 is a sectional view taken on the line 8—8 of Fig. 7.
Figure 9:
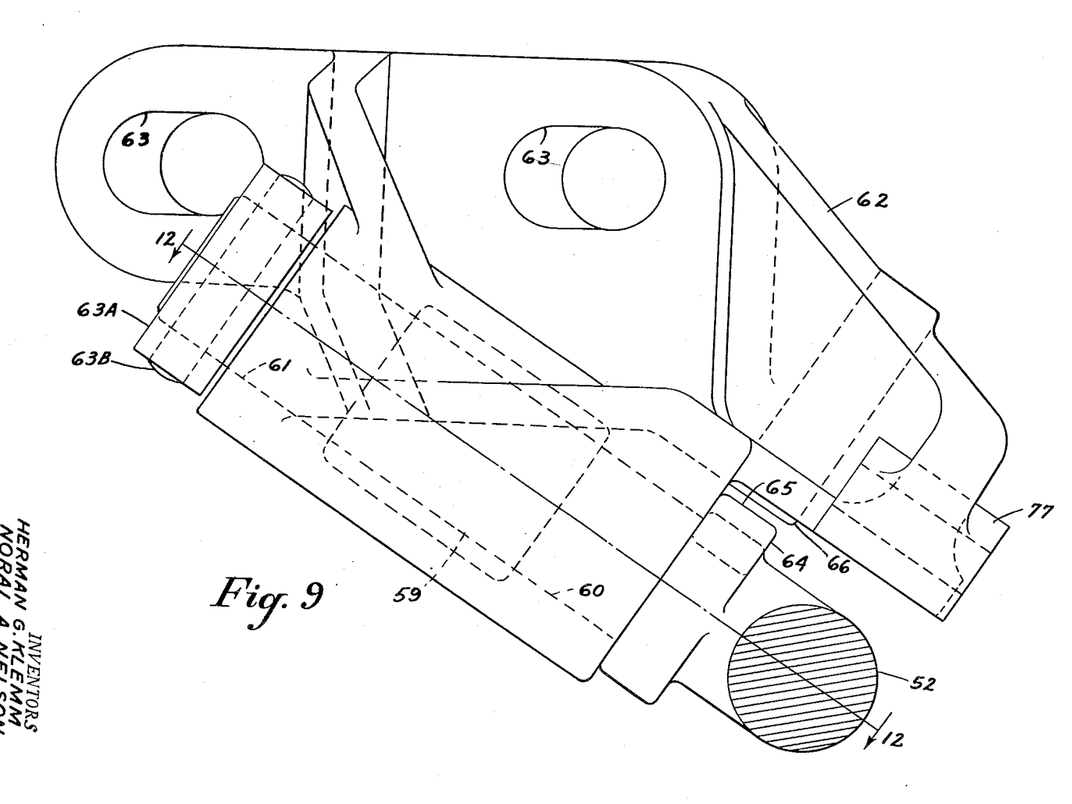
Fig. 9 is a detail view partially in section, showing the arm for the furrow wheel and its mounting.
Figure 12:
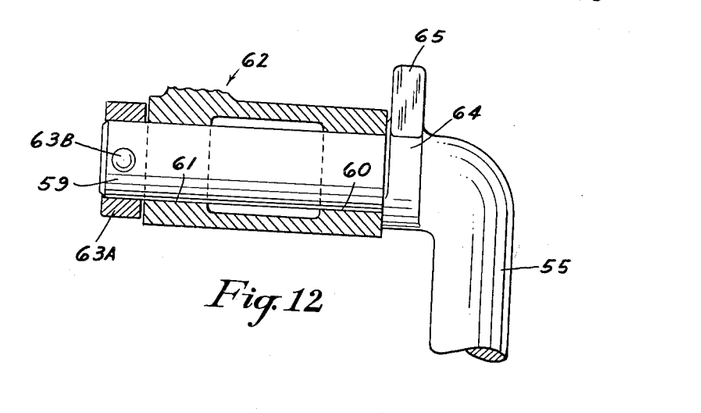
Fig. 12 is a sectional view taken on the line 12—12 of Fig. 9.
Figure 14:
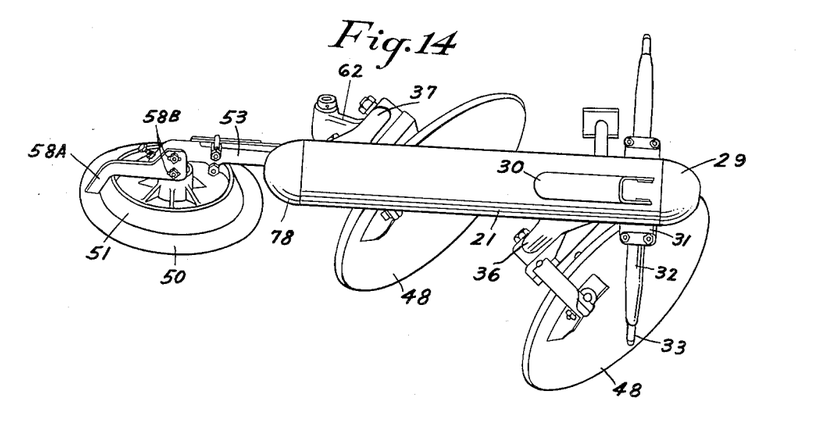
Fig. 14 is a plan view of a two-disc plow constituting a modified form of the present invention.

The arm 53 has a transverse end portion 59 (Figs. 8, 9 and 12) serving to mount the arm pivotally in bearing portions 60 and 61 formed in a bracket 62, secured to the plate 38 attached to the tail member by the bolts 42, which otherwise attach the support 41 to the plate 38. Figs. 2, 4, and 5 show the complete bracket 62 attached to the plate, and Fig. 6 shows the plate 38 and only the portion of the bracket 62 through which the bolts 42 extend. Fig. 9 shows the bracket 62 separately, with its elongated openings 63, through which the attaching bolts 42 extend, and which permit the bracket 62 to be adjusted horizontally along the plate 38, thus providing for lateral adjustment of the furrow wheel 50 and the arm 53 with respect to the rest of the plow. The transverse end 59 of the arm 53 is retained in the bearings 60 and 61 by a collar 63A held on the transverse end by a pin 63B. The arm is formed adjacent the transverse end 59 with a shoulder 64 (Figs. 9 and 10) having a flat surface 65, which abuts an adjacent portion 66 of the bracket 62 above the shoulder and thereby limits downward movement of the arm 53 and the furrow wheel 50 with respect to the rest of the plow. The arm and furrow wheel are urged downwardly by means of a leaf spring 67 and a pair of links 68 as shown in Fig. 10. The leaf spring is formed of a long leaf 69 and a short leaf 70 keyed to one another through engagement of a protuberance 71 on the short leaf 70 with a recess in the long leaf. The leaf spring 67 is clamped to the arm 53 by a U-bolt 72, which cooperates with a projection 73 on the leaf 69, engaging a recess 74 in the arm to prevent sideways movement of spring with respect to the arm. The leaf 69 has a curved end 74 engaging a pin 75 connecting the lower ends of links 68. A pin 76 pivotally connects the upper ends of links 68 to a portion 77 of the bracket 62.

Our experience has shown us that the disc of the furrow wheel should be somewhat inclined during operation so that it will cut transversely into the furrow wall, as shown in Fig. 5. We have also learned that the furrow wheel can best resist movement of the plow to the left, as viewed in Fig. 5, due to the ground forces on the discs 48 if it is not in a "longitudinally" inclined plane, i. e., an inclined plane containing a line extending in the intended direction of movement of the plow, but in a "diagonally" inclined plane displaced by a small angle from the "longitudinally" inclined plane so that the rear edge of the wheel is somewhat leftward of the front edge. This angle between planes is known as the lead angle and is indicated by the figure opposite which the front edge of the part 52 falls on the indicia on the arm 53. The value of the lead angle should be relatively constant in the various vertical positions the furrow wheel 50 may occupy with respect to the plow discs 48 as the plow moves across depressions, rises, etc. We have discovered that the variation in the lead angle with change in the vertical position of the plow disc can be kept to a minimum if the pivot axis for vertical movement of the furrow wheel is kept generally transverse of the plane of the furrow wheel. This requires inclining the pivot axis generally transversely of the plow. The transverse end 59 on the arm 53 constitutes the pivot axis for the furrow opener and will be observed to extend inclined generally transverse of the plow.

Figure 15:
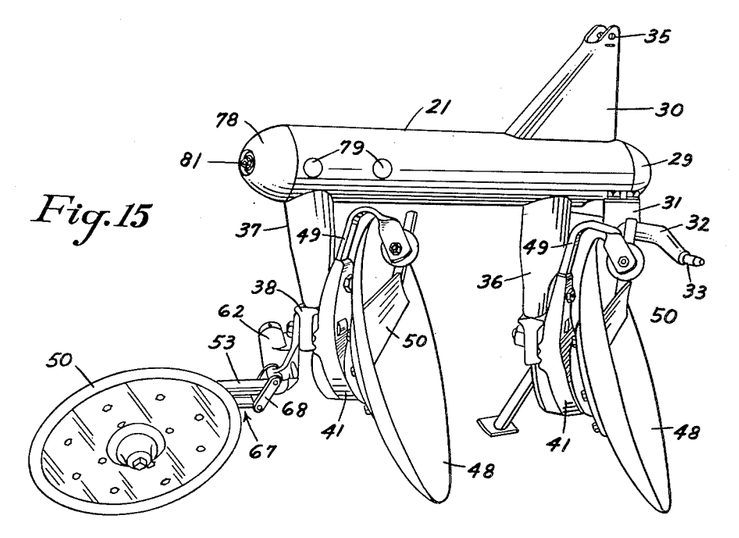
Fig. 15 is a perspective view of the two-disc plow.
Figure 16:
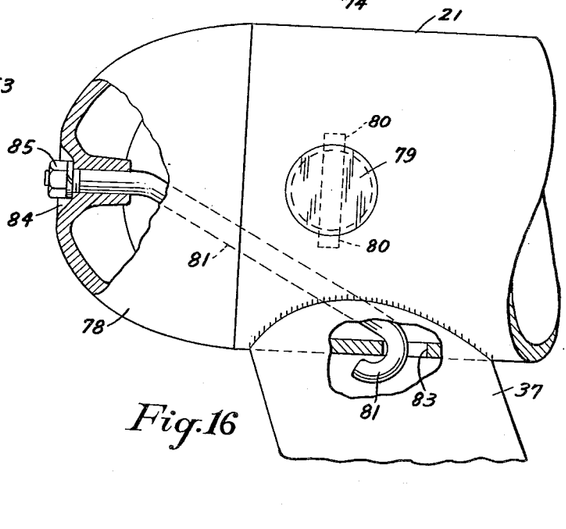
Fig. 16 is a detailed view of a portion of the two-disc plow, partially in section.
Figure 17:
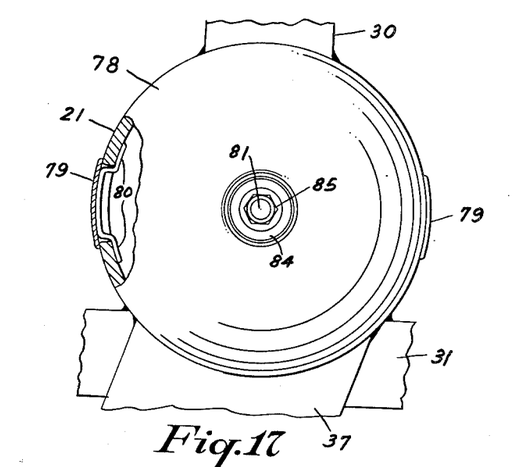
Fig. 17 is a rear view of a portion of the two-disc plow, partially in section.

Figs. 14–17 inclusive show the principles of the present invention applied to the disc plow just described. It is also a concept of the present invention to make the plow readily convertible in the manner now to be described, from three discs to two discs and vice versa. For converting, the tail member 22 is removed from the beam 21 after the bolts 25 and bushings 27 (Fig. 13) have been removed, and the tail member is replaced by a cap 78 (Fig. 16). Before the cap 78 is applied, closures 79 having legs 80 are applied to the openings in the beam previously occupied by the bushings 27. Upon application the legs 80 are straight and are inserted through the beam openings from the outside. Then the legs are spread, as shown in Fig. 16, so as to be brought against the inside of the beam, by operations performed from the inside, access being had through the open rear end of the beam 21. Then a hook end 81 on a rod 82 is inserted in an opening 83 in the beam 21, covered by the hanger 37. The other end of the rod is bent and threaded and received in an opening in the cap 78. A portion of the said end extends beyond the cap and into a recess 84 formed therein and receives a nut 85, tightly holding the cap against the rear end of the beam 21.

The cap 29 may be secured in similar fashion to the front end of the longitudinal member 21.

Now the assembly comprising bracket 62, arm 53, spring 67, links 68, part 52, scraper 58A, and furrow wheel 50 is detached from the plate 38 on the tail member 23 and is applied to the rear side of the plate 38 on the hanger 37, as shown in Fig. 15.

The relation of the furrow-wheel axis formed by the transverse end 59 on the arm 53 to the intended direction of movement of the plow is the same for the two-disc plow as for the three disc plow. The furrow-wheel axis is inclined generally transversely of the line of movement. The lead angle of the furrow wheel may be kept the same or may be changed as may be needed to counteract the tendency of the two plow discs in their tendency to move the plow laterally of its intended line of movement, differently from three plow discs.

The reverse of the aforementioned procedure is followed to reconvert the plow to three discs.

It will be observed that the novel arrangement of longitudinal member 21 and diagonal tail member 22 with depending rear end 23 makes feasible the ready conversion between two plowing elements and three plowing elements. The longitudinal member is ideally suited for mounting two discs, and the diagonal tail member with depending end can be readily attached to the longitudinal member to provide a mounting for the third disc.

We claim as our invention:

1. Apparatus comprising a supporting structure, a plurality of plow discs mounted thereon, a furrow wheel, and means mounting the furrow wheel on the supporting structure for pivotal movement of the furrow wheel about an axis generally transverse to the direction of movement of the plow discs during operation, said mounting means including an arm pivoted adjacent one end on the supporting structure and having a part adjacent the other end journaling said wheel, said axis being inclined at an angle to the horizontal such that the furrow wheel is maintained at a uniform angle and generally transverse to the said axis during its pivotal movement.

2. The apparatus specified in claim 1, the furrow wheel being somewhat angled to a plane containing a line extending in the direction of movement of the plow discs, the furrow wheel thus having a lead angle.

3. Apparatus comprising a supporting structure, a plurality of plow discs mounted thereon, a furrow wheel, an arm, means providing an adjustable rotatable mounting of the furrow wheel on one end of the arm whereby the lead angle of the furrow wheel may be changed, means mounting the other end of the arm on the structure for pivotal movement of the arm and the furrow wheel about an axis inclined from the horizontal and disposed generally transverse of the direction of movement of the plow discs and to the plane of the furrow wheel so that the lead angle of the furrow wheel is maintained substantially constant in all positions of said arm.

4. Apparatus comprising a supporting structure, a plurality of plow discs mounted thereon, a furrow wheel, an arm rotatably mounting the furrow wheel at one end and pivotally connected at its other end to the supporting structure, a pair of links pivoted at their upper ends to said supporting structure and depending on opposite sides of said arm, a pin extending between the free ends of said arms, and a leaf spring having one portion clamped to the arm and another portion engaging said pin so as to exert a thrust through said links against the supporting structure to urge the arm and the furrow wheel downward with respect to the supporting structure and the plow discs.

5. Apparatus comprising a supporting structure, a plurality of plow discs mounted thereon, a furrow wheel, an arm rotatably mounting the furrow wheel at one end and pivotally connected at its other end to the supporting structure, a leaf spring having one portion clamped to the arm, a link pivoted on the supporting structure near the mounting of the arm thereon and pivotally bearing on a portion of the leaf spring spaced from the portion thereof clamped to the arm to urge the arm and the furrow wheel downward with respect to the supporting structure and the plow discs.

6. Apparatus comprising a supporting structure, a plurality of plow discs mounted thereon, a furrow wheel, an arm carrying the furrow wheel adjacent one of its ends, and means mounting the arm adjacent its other end on the supporting structure for pivotal movement of the arm and the furrow wheel with respect to the supporting structure about an axis disposed generally transversely of the direction of movement of the plow discs during operation and lying in a plane diagonally inclined with respect to a plane parallel to such direction of movement so as to maintain the furrow wheel generally transverse to the said axis.

7. Apparatus comprising a supporting structure, a plurality of plow discs mounted thereon, a furrow wheel, an arm carrying the furrow wheel, means mounting the arm on the supporting structure for pivotal movement of the arm and the furrow wheel with respect to the supporting structure about an axis generally transverse to the direction of movement of the plow discs and inclined with respect to a horizontal plane, said furrow wheel being disposed in a plane generally transverse to the said axis, and a leaf spring clamped at one portion of the arm and acting at another portion against the supporting structure to urge the arm and the furrow wheel downwardly.

8. A plow comprising a longitudinal member extending in the direction of the intended movement of the plow, a first plow disc adjacent the front end of the longitudinal member and offset laterally to one side of the member, means mounting the first plow disc on the member, a second plow disc adjacent the rear end of the member, a tail member extending from the rear end of the member rearwardly and to the other side of the member and having a depending end portion, a third disc, disposed to the said opposite side of the longitudinal member and being on a general line with the first and second discs extending diagonally of the plow, and means mounting the third disc on the depending end portion of the tail member.

9. A plow comprising a longitudinal member extending in the direction of intended movement of the plow, a first plow disc adjacent the front end of the longitudinal member and offset laterally to one side of the member, a first hanger for the first plow disc depending from the member rearwardly and to the said one side of the member, a second plow disc adjacent the rear end of the member, a second hanger for the second plow disc depending from the member forwardly and to the other side of the member, a tail member extending from the rear end of the member rearwardly and to the opposite side of the member and having a depending end portion, a third disc, disposed to the said opposite side of the longitudinal member and being on a general line with the first and second discs extending diagonally of the plow, and means mounting the third disc on the depending end portion of the tail member.

10. In a disc plow, in combination, a disc supporting structure comprising an elongated tubular member, brackets adjacent one end of the member providing draft connections for the plow, hangers rigid with said member and projecting radially therefrom, each of said hangers having means adjacent its projecting end for supporting a plow disc, an auxiliary tubular member, a hanger projecting radially from said auxiliary member and having means adjacent its projecting end for supporting a plow disc, said auxiliary member having one end portion adapted to fit into the other end of said elongated member, and means coacting with said one end portion of the auxiliary member for disengageably connecting the members together to form a rigid structure.

HERMAN G. KLEMM.
NORAL A. NELSON.

References Cited in the file of this patent

UNITED STATES PATENTS

| Number | Name | Date |
|---|---|---|
| 1,401,496 | Rimple et al. | Dec. 27, 1921 |
| 1,888,876 | Mahan | Nov. 22, 1932 |
| 2,195,515 | Ferguson | Apr. 2, 1940 |
| 2,448,469 | Rutter | Aug. 31, 1948 |

FOREIGN PATENTS

| Number | Country | Date |
|---|---|---|
| 607,725 | Germany | Jan. 5, 1935 |